(12) United States Patent
Obr et al.

(10) Patent No.: US 8,214,621 B2
(45) Date of Patent: Jul. 3, 2012

(54) STORAGE OPTIMIZATION ACROSS MEDIA WITH DIFFERING CAPABILITIES

(75) Inventors: Nathan Steven Obr, Bellevue, WA (US); Robert Dale Rinne, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 503 days.

(21) Appl. No.: 12/432,338

(22) Filed: Apr. 29, 2009

(65) Prior Publication Data

US 2010/0281233 A1    Nov. 4, 2010

(51) Int. Cl.
*G06F 13/00* (2006.01)

(52) U.S. Cl. ........ 711/173; 711/170; 711/166; 711/162; 711/E12.001; 711/E12.002

(58) Field of Classification Search .................. 711/173, 711/170, 166, 162, E12.001, E12.002
See application file for complete search history.

(56) References Cited

U.S. PATENT DOCUMENTS

| | | | |
|---|---|---|---|
| 6,834,326 B1 | 12/2004 | Wang et al. | |
| 6,842,793 B2 | 1/2005 | Ohashi et al. | |
| 6,952,753 B2 | 10/2005 | Ralphs | |
| 7,096,336 B2 * | 8/2006 | Furuhashi et al. | ............ 711/165 |
| 7,266,638 B2 | 9/2007 | Coppock et al. | |
| 7,330,930 B1 | 2/2008 | Nagshain | |
| 7,478,196 B2 | 1/2009 | Rothman et al. | |
| 2005/0091449 A1 | 4/2005 | Cherian | |
| 2006/0190682 A1 | 8/2006 | Noguchi et al. | |

FOREIGN PATENT DOCUMENTS

WO    2008070173 A1    6/2008

OTHER PUBLICATIONS

Lau, Henry, "Microsoft SQL Server 7.0 Performance Tuning Guide", Retrieved at <<http://msdn.microsoft.com/en-us/library/aa226166(SQL.70).aspx>>, Oct. 1998, pp. 40.

* cited by examiner

*Primary Examiner* — VanThu Nguyen (57) ABSTRACT

A storage device can comprise storage media that can have differing characteristics. A storage manager can obtain the characteristics of a storage device, and of individual portions, such as individual media, of the storage device, by querying the device, querying a database, or through empirical observation or testing. The storage manager can then divide the media of the storage device into storage media parts, that can comprise some or all of the individual storage media. Data can then be stored on one or more storage media parts in accordance with the information provided by metadata associated with the data, such that the data is stored on storage media parts that are optimal for such data, from among the available storage media parts, based on the information from the associated metadata.

17 Claims, 5 Drawing Sheets

STORAGE OPTIMIZATION ACROSS MEDIA WITH DIFFERING CAPABILITIES

BACKGROUND

Modern storage media includes, not only media that store data in a physically sequential manner, such as traditional magnetic and optical storage media, but also media that store data in a physically random manner, such as solid-state based storage media. Such physically random media allow any one block of data to be accessed as efficiently as any other block of data. These, and other, physical differences between the various storage media commonly available today result in storage media that differ in capability and performance. For example, magnetic and optical media require a reading and writing apparatus that physically moves from the physical location of the device head to the physical location of a block. Consequently, the speed with which such storage media can read or write data is dependent upon the proximity of the locations of the data on the media, since the device head must physically transition from one location to the other. Conversely, solid-state based storage media can read and write data through electrical signals that do not require any physically moving parts. As a result, the data stored on such media can be written, or read, with efficiency that is not dependent upon the particular location of the data.

From the perspective of a user of such storage media, magnetic and optical storage media that store data in a sequential manner are generally regarded as having specific capability and performance advantages and disadvantages with respect to solid-state based storage media. For example, magnetic media is generally regarded as having a greater density per unit of area than solid state media. As a result, magnetic media can store between three to five times more information than solid-state media within a given physical area. Similarly, magnetic storage media are generally regarded as being able to write a large amount of data in a sequential manner faster than solid-state based storage media, again due to the sequential nature of magnetic storage media. By contrast solid-state based storage media are generally regarded as being able to read and write small amounts of randomly addressed data, in a substantially faster manner than magnetic or optical storage media.

One capability difference between solid-state based storage media and magnetic and optical storage media that can have a substantial impact on the user of such storage media is the reliability of such storage media. Traditional magnetic media is generally considered to have a substantial usage period between failures. Such media can be written repeatedly without special consideration being paid to wear or data loss, except, of course, in statistically rare mechanical failures. Solid-state based storage media, on the other hand, are generally considered to have a limited number of writes before their physical nature can result in data loss at an individual bit level. Techniques such as "wear leveling" can be utilized to prevent prematurely excessive utilization of portions of such solid-state based storage media, but such wear leveling techniques can have a performance impact.

Modern storage devices including both sequential based storage media devices, and solid-state based storage media devices, traditionally comprise, in addition to the storage media itself, one or more capable controllers, which are designed to manage the data stored on the storage media itself. These controllers can perform management tasks that are internal to the storage device itself, such as, for example, compaction, encryption and wear leveling.

SUMMARY

Application programs and operating systems which generate data to be stored on storage media can also comprise the ability to generate information describing the generated data. Such information is traditionally referred to as "metadata" and can comprise information about how the generated data will be utilized, what its importance level is, the overall quality of service needed when accessing the data, the type of information represented by the data, and other parameters relevant to the utilization of such data.

In one embodiment, a particular storage medium, from among available storage media, can be selected to store data based on the information about such data contained in the metadata that is associated with such data. The selection of a storage medium can be based on the applicability, to the data being stored thereon, of that storage medium's capabilities and performance, as compared to the capabilities and performance of other available storage media.

In a further embodiment, the capabilities and performance of storage media can be retrieved from the storage device itself. Alternatively, the capabilities and performance of a device's storage media can be retrieved from an accessible database that is appropriately updated.

In a still further embodiment, utilization of a storage device can be monitored, and the capabilities and performance of the storage device's storage medium can be derived from empirical data obtained through such monitoring.

In another embodiment, storage media can be logically segmented into addressable parts that can be individually regarded for purposes of storing data. Such storage media parts can be delineated such that a particular storage media part comprises physical characteristics, including capabilities and performance characteristics, that differ from other storage media parts, including storage media parts that are all from a single storage media device.

In yet another embodiment, multiple copies of the same data can be stored on individual storage media or storage media parts. Such multiple copies can include multiple copies for redundancy and data safety purposes and multiple copies to facilitate striped reading and writing of data for efficiency purposes.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to the utilization of metadata to select one or more storage media, or separately addressable and accessible portions of a storage media, on which to store data associated with the metadata such that the data is stored on a media, or portions of media, whose capabilities and performance are optimal, given the information about the data contained in the metadata. Available and accessible storage devices can be queried for their storage media's capabilities and performance, or such data can be obtained from a periodically updated, centralized database. Alternatively, a storage device's media capabilities and performance can be derived from empirical data gathered from observations of the storage device's media while being utilized in a traditional manner. Storage media can also be logically divided into separately addressable and accessible physical portions if those portions can be defined such that the capabilities and performance of the portions differ from other portions of the storage medium.

The techniques described herein focus on, but are not limited to, solid-state based storage devices and magnetic based storage devices. Indeed, the mechanisms described in detail below are directed to the capabilities and performance of storage media, or parts of storage media, as opposed to the underlying physical methodologies utilized. As such, the mechanisms described below are equally applicable to any type of storage media and any type of storage mechanism, so long as capability and performance information regarding such storage media and mechanisms can be obtained. Thus, references below to solid-state based storage devices and magnetic based storage devices are meant to be exemplary only, specifically as examples of storage media having substantially differing capabilities and performance, and are not meant to limit the below descriptions to specific storage mechanisms or specific storage hardware.

Although not required, the descriptions below will be in the general context of computer-executable instructions, such as program modules, being executed by one or more computing devices. More specifically, the descriptions will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments where tasks are performed by remote processing devices that are linked through a communications network. In a distributed computing environment, program modules may be located in both local and remote memory storage devices.

Figure 1:
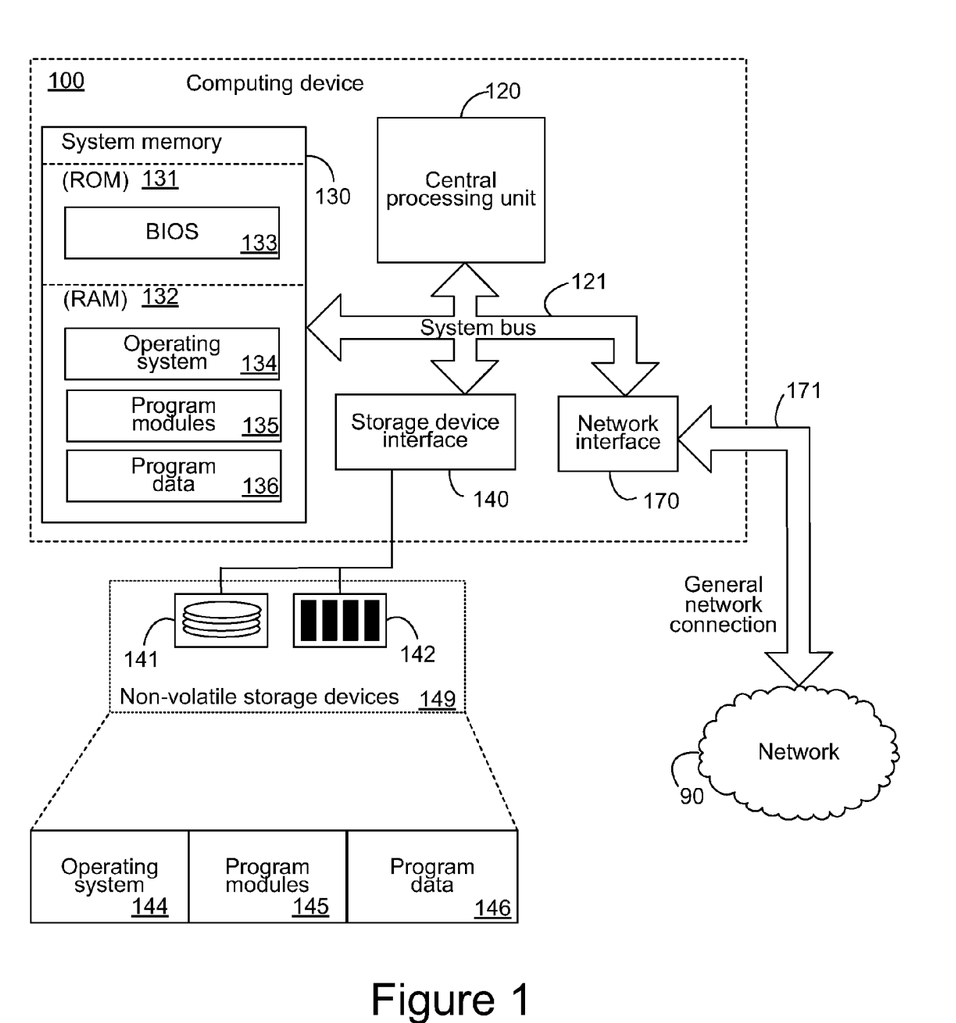
FIG. 1 is a block diagram of an exemplary computing device.

With reference to FIG. 1, an exemplary computing device 100 is illustrated, which can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 1 illustrates an operating system 134, other program modules 135, and program data 136.

The computing device 100 may also include other removable/non-removable, volatile/nonvolatile computer storage media. FIG. 1 illustrates one or more non-volatile storage devices 149, each containing non-volatile storage media, connected to the computing device 100 via a storage device interface 140 that is, in turn, connected to the system bus 121. By way of example only, the one or more non-volatile storage devices 149 include a hard disk drive 141, which can utilize magnetic based storage media, and a flash drive 142 that can utilize solid-state based storage media, including storage media based on single-level cell (SLC) or multi-level cell (MLC) based solid-state technology. Other removable/non-removable, volatile/nonvolatile computer storage media and storage devices that can be used with the exemplary computing device include, but are not limited to, FLASH memory cards, or other solid-state storage devices, including RAM disks, hard drives, magnetic tape cassettes, digital versatile disks, digital video tape and other sequential storage devices.

The drives 141 and 142, and their associated computer storage media discussed above and illustrated in FIG. 1, provide storage of computer readable instructions, data structures, program modules and other data for the computing device 100. In FIG. 1, for example, the storage devices 149 are illustrated as storing an operating system 144, other program modules 145, and program data 146. Note that these components can either be the same as or different from operating system 134, other program modules 135 and program data 136. Operating system 144, other program modules 145 and program data 146 are given different numbers here to illustrate that, at a minimum, they are different copies.

Additionally, the computing device 100 may operate in a networked environment using logical connections to one or more remote computers. For simplicity of illustration, the computing device 100 is shown in FIG. 1 to be connected to a network 90 that is not limited to any particular network or networking protocols. The logical connection depicted in FIG. 1 is a general network connection 171 that can be a local area network (LAN), a wide area network (WAN) or other network. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

Figure 2:
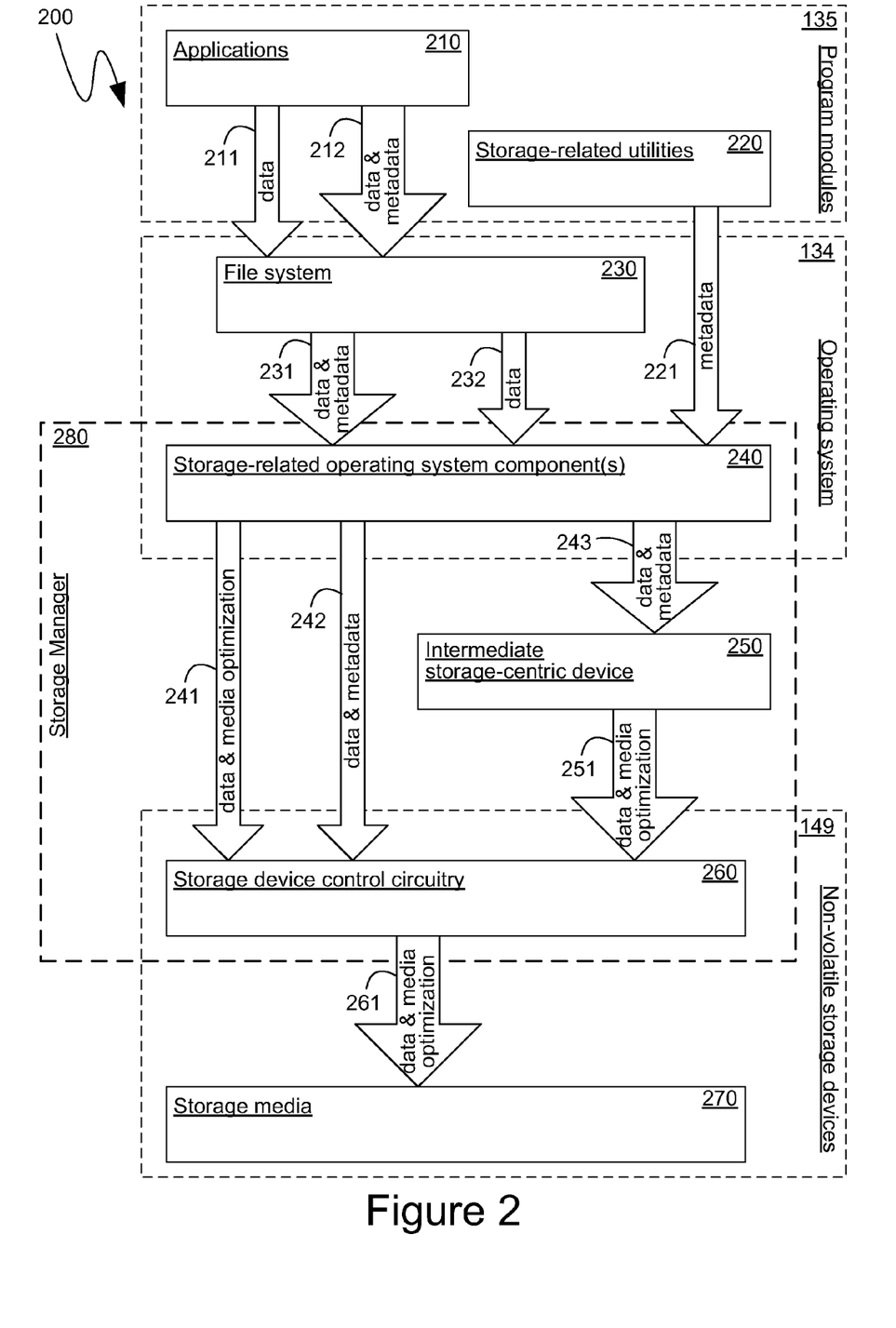
FIG. 2 is a layer block diagram of an exemplary series of alternative communications and objects.

Turning to FIG. 2, more specific components or elements of the generic program modules 135 and operating system 134 of FIG. 1 are shown in the layer system 200. In particular, as shown, the generic program modules 135 of FIG. 1 can include one or more application programs, such as the applications 210, and one or more storage-related utilities 220. As will be known by those skilled in the art, both the applications 210 and the utilities 220 can be comprised of computer-executable instructions that can be executed by the exemplary computing device 100 to perform various functions and tasks. Similarly, the omnibus operating system 134 of FIG. 1 can comprise computer-executable instructions directed to the implementation of, and the maintenance of, a file system 230 and can further comprise one or more storage-related operating system components 240, which can comprise computer-executable instructions directed to the performance of storage-related tasks or otherwise directed to the utilization or control of the one or more storage devices 149 communicationally coupled to the computing device 100.

The storage devices 149 were illustrated in FIG. 1 as exemplarily comprising a physical hard disk drive 141 and a physical solid-state drive 142. As will be known by those skilled in the art, each of such drives 141 and 142, and any other drives that can be part of the one or more storage devices 149, can comprise control circuitry 260 for controlling physical aspects of the drive, and can further comprise the storage media 270 on which the data is actually stored. Consequently, in the layered system 200 of FIG. 2, the storage devices 149 are shown as comprising one or more storage device control circuitry, such as the storage device control circuitry 260, and one or more storage media, such as the storage media 270. For purposes of the illustration provided in FIG. 2, the storage media 270 can be any of the above described storage media, including magnetic based storage media, solid-state based storage media, or any other storage media.

The one or more storage devices 149, shown in FIG. 1 as being communicationally coupled to the computing device 100 via a storage device interface 140, can, in one embodiment, be only indirectly communicationally coupled to the computing device 100. Instead, as shown in FIG. 2, the one or more storage devices 149 can be communicationally coupled to an intermediate storage-centric device 250, and the intermediate storage-centric device 250 can, then, be communicationally coupled to the computing device 100 via the storage device interface 140. Such an intermediate storage-centric device 250 can include interface or protocol adapters or translators designed to enable communications between storage devices having one type of interface and a computing device having another type of interface. Such an intermediate storage-centric device 250 can also include devices designed to amalgamate multiple devices, such as the hard disk drive 141 or the solid-state drive 142, into a single storage unit, such as a Redundant Array of Inexpensive Disks (RAID) device or a Just a Bunch Of Disks (JBOD) device.

In one embodiment, the applications 210 can generate data to be stored on a storage medium such as one or more of the storage media 270. Traditionally, such data generated by the applications 210 would be provided to the file system 230 of the operating system 134 for storage onto a storage media. Thus, as shown in the system 200, a communication 211 from the applications 210 to the file system 230 can provide data generated by the applications that is to be stored on a storage medium. In an alternative embodiment, the applications 210 can generate both data to be stored on a storage medium and information about that data, traditionally called "metadata". The data and corresponding metadata can likewise be provided by the applications 210 to the file system 230, as indicated by the communication 212 of system 200.

If the file system 230 was provided only data from the applications 210, as illustrated by communication 211, then, in one embodiment, the file system 230 can generate metadata associated with the data received from the applications 210. Subsequently, the file system 230 can provide the data and associated metadata, whether received from the applications 210 or generated by the file system itself, to storage-related operating system components 240 for storage on one or more of the storage devices 149.

In another embodiment, the file system 230 either may not be capable of generating, or may not have sufficient information from which to generate, metadata associated with the data from the applications 210 received via communication 211. In such an embodiment, the file system 230 can pass the data received from the applications 210 to other operating system components, such as the storage-related operating system components 240 without adding metadata, as illustrated by communications 232 of the system 200. In such an embodiment, metadata associated with the data of communication 232 can be provided by, for example, one or more storage-related utilities 220. Such storage-related utilities 220 can include specialized utilities, comprising computer-executable instructions directed to monitoring data access by, for example, the applications 210 and generating associated metadata from empirically derived information. Thus, as shown in the system 200, storage-related utilities 220 can provide metadata, via communication 221, directly to the storage-related operating system components 240, bypassing the file system 230.

In another embodiment, if the file system 230 is incapable of generating, or does not have sufficient information from which to generate, metadata associated with the data from the applications 210 received via the communication 211, components of the operating system 134, such as the storage-related operating system components 240, can generate such metadata. Thus, for example, the data received by the file system 230 from the application 210 via the communication 211 can be passed, via communication 232, to the storage-related operating system components 240. The storage-related operating system components 240 can then, in turn, generate metadata for such data and provide the data, and the metadata they generated, to the storage devices 149 via communication 242. Alternatively, as will be described further below, the storage-related operating system components 240 can, not only generate the metadata associated with the data of communications 211 and 232, but can also perform media optimization based on such data. Although not specifically illustrated in FIG. 2, other components of the operating system 134 can, like the applications 210, generate data for storage on the storage media 270. For example, components of the operating system 134, such as the power manager, search engine, automatic updater, and other like components, can generate either merely data, or data and associated metadata, that can be provided, such as by the file system 230, to the storage-related operating system components 240 for determining where to store data on the storage media 270.

In one embodiment, the metadata associated with data, whether created by the same process as the data, or by a different process, can provide information about the data that can aid in the selection of an optimum storage medium, or part of a storage medium, on which to store the data. For example, the metadata can indicate the size of the data, whether the data is part of a stream or file or other type of storage container, and whether the data is associated with, or often utilized in conjunction with, other data. The metadata can also, for example, indicate the importance of the data, the length of time that the data is expected to be retained, such as, for example, whether the data is permanent data or temporary data, and whether the data is compressed, encrypted, or otherwise modified and whether such modifications, if not already applied, should be applied to the data by, for example, the storage device control circuitry 260 in the storage device 149.

Metadata, such as that described above, can be utilized by a storage manager, such as the storage manager 280, to select one or more storage media, or one or more parts of storage media, on which to store the data about which the metadata provides information. As illustrated by the system 200 of FIG. 2, in various embodiments, the storage manager 280 can include one or more of the storage device control circuitry 260, one or more intermediate storage-centric devices 250, and one or more storage-related operating system components 240. Thus, as used in the description below, the term "storage manager" means any component, device, or combination of components and/or devices, that selects, or aids in selecting, one or more storage media, or one or more parts of storage media, on which to store data based on the information contained in the metadata associated with the data.

For example, in one embodiment, storage-related operating system components 240 that can be part of the operating system 134, can provide media optimization after receiving the data and metadata, such as, for example, via communication 231, or the combination of communications 232 and 221, or after receiving the data, such as, for example, via communication 232, and then internally generating metadata associated with such data. The provided media optimization can comprise the selection of one or more storage media, or parts of storage media, on which to store the data. The provided media optimization can also comprise the dividing of storage media into storage media parts, as will be described in detail below.

As shown in the system 200 of FIG. 2, the storage-related operating system components 240 of the operating system 134 can, via communication 241, provide data and media optimization, such as an indication of which storage media was selected for the data, to the storage device control circuitry 260 of the one or more storage devices 149 for ultimate storage on the storage media 270 of those storage devices. In an alternative embodiment, the operating system 134 may not possess computer-executable instructions for performing storage manager functions. For example, the storage-related operating system components 240 may merely comprise traditional device drivers or other like operating system components. In such an embodiment, the storage-related operating system components 240 can, as illustrated by communications 242 or 243 of the system 200, merely provide the data and associated metadata to other components or devices.

In one embodiment, storage device control circuitry 260 of the one or more storage devices 149 can perform storage manager functions by receiving the data and associated metadata from, for example, the storage-related operating system components 240, as illustrated by communication 242, and then performing media optimization on the data and storing it accordingly on the storage media 270, as shown by communications 261. As indicated previously, and as will be described in greater detail below, the media optimization performed, in the described embodiment, by the storage device control circuitry 260 can include the division of the available storage media 270 into storage media parts, and the selection of one or more storage media, or one or more storage media parts, on which to store the data.

In an alternative embodiment, the storage-related operating system components 240 can provide data and associated metadata to an intermediate storage-centric device 250 that can act as the storage manager 280. Thus, as shown by the system 200 of FIG. 2, the storage-related operating system components 240 can provide data and associated metadata to the intermediate storage-centric device 250 via communication 243. Subsequently, the intermediate storage-centric device 250 can perform relevant media optimization, including the selection of specific ones of the storage media 270, or parts thereof, on which the data received via communication 243, should be stored. The intermediate storage-centric device 250 can then, via communication 251, provide the data and associated media optimization information to the storage device control circuitry 260 for storage on the storage media 270. The intermediate storage-centric device 250 can also, if appropriate, perform other storage manager functions, including, for example, dividing the storage media 270 into appropriate storage media parts, as will be described in detail below. As can be seen, the functionality of the storage manager 280 can be performed by computer-executable instructions executing on the computing device 100, such as the storage-related operating system components 240, or it can be performed by dedicated circuitry, and associated control instructions, that are part of the one or more storage devices 149, such as the storage device control circuitry 260, or, as a further alternative, it can be performed by dedicated circuitry, and associated instructions, that can be part of a device communicationally located between the storage devices 149 and the computing device 100, such as the intermediate storage-centric device 250. As indicated previously, the functionality of the storage manager 280 can also be performed by any combination of the above described entities.

Figure 3:
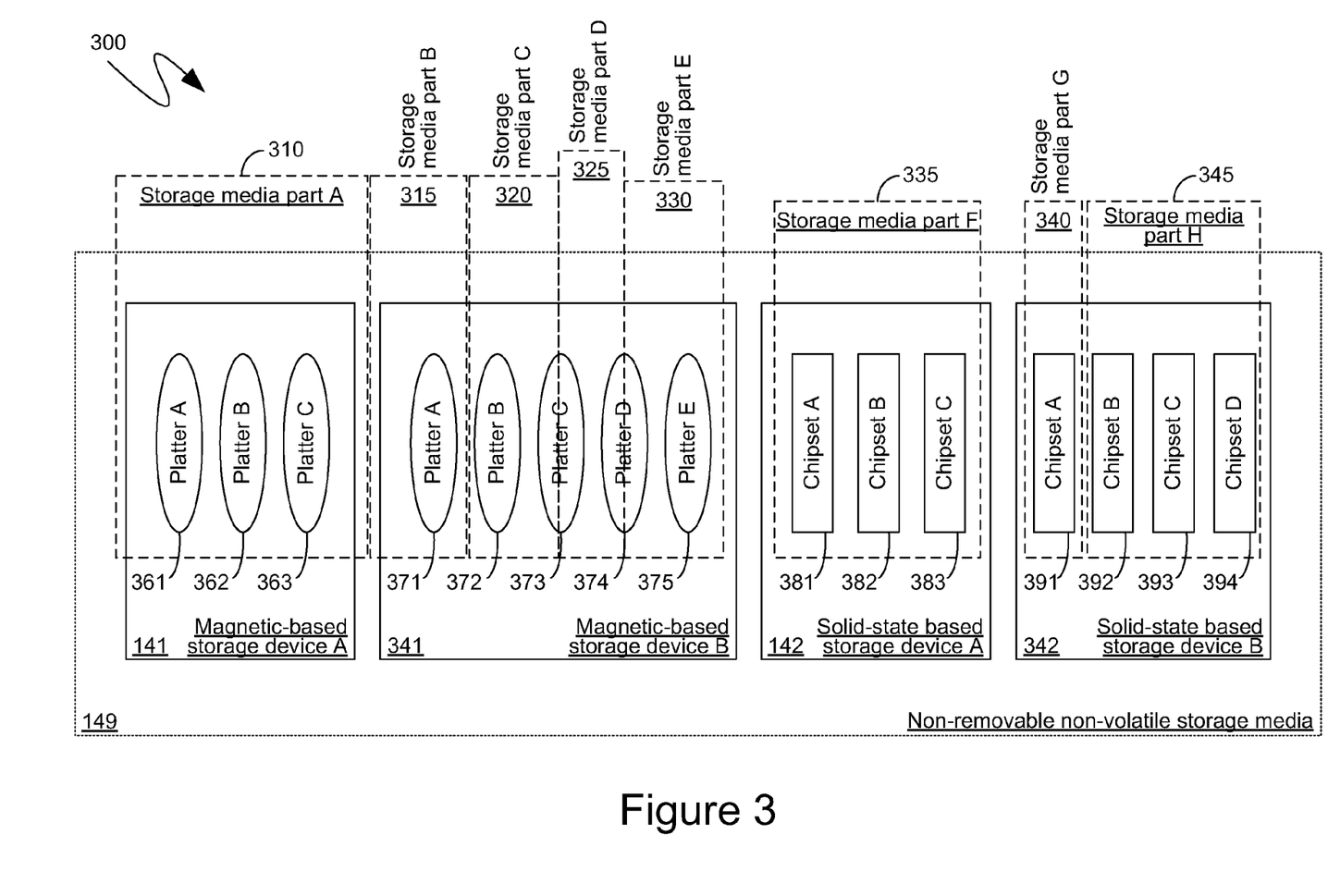
FIG. 3 is a block diagram of an exemplary dividing of storage media into storage media parts.

Turning to FIG. 3, the dividing of storage media into storage media parts, such as can be performed by the storage manager 280, is described in greater detail with reference to the system 300. As can be seen, the system 300 can comprise non-volatile storage media in one or more storage devices 149 of FIG. 1, now shown as comprising, for explanatory purposes only, four separate storage devices, namely magnetic-based storage device 141, described above, and an analogous magnetic-based storage device 341, and solid-state based storage device 142, also described above, and an analogous solid-state based storage device 342. As will be known by those skilled in the art, magnetic-based storage devices, such as magnetic-based storage devices 141 and 341, comprise, among other hardware components, rotating platters of magnetic material that physically retain information in magnetic form. For purposes of description and illustration only, and not by way of limitation, the magnetic-based storage device 141 is shown as comprising three such platters, namely platters 361, 362 and 363, while the magnetic-based storage device 341 is shown as comprising five such platters, namely platters 371, 372, 373, 374 and 375. Similarly, as will also be known by those skilled in the art, solid-state based storage devices, such as the solid-state based storage devices 142 and 342, comprise, among other hardware components, chipsets that contain the semiconductor structures that physically retain information in solid-state form. Again, for purposes of description and illustration only, and not by way of limitation, the solid-state based storage device 142 is shown in FIG. 3 as comprising three such chipsets, namely chipsets 381, 382 and 383, while the solid-state based storage device 342 is shown as comprising four such chipsets, namely chipsets 391, 392, 393 and 394.

In one embodiment, a storage manager, such as the storage manager 280, can divide the available non-volatile storage media 270 in the one or more storage devices 149 into storage media parts, from among which one or more parts can be selected for storing data so as to optimize access to that data in accordance with the information about the data contained in the associated metadata. Thus, in dividing the available storage media into parts, the storage manager 280 can select and establish parts that can, to a certain extent, comprise homogenous capabilities and performance characteristics across the part, but that differ, in capabilities and performance, from other parts.

For example, as illustrated by the system 300, the storage manager 280 can select all of the hard disk drive 141 to be a storage media part 310. The storage manager 280 can also, for example, select all of the solid-state drive 142 to be a storage media part 335. Such a division of the available storage media can, as indicated, be based on the capabilities and performance of the storage media. For example, the hard disk drive 141 may comprise a large storage capability as compared to the solid-state drive 142, while the solid-state drive may comprise greater random read and write performance as compared to the hard disk drive 141.

The capability and performance of a storage medium can be obtained, as indicated previously, and as will be described further below, through multiple mechanisms, including polling of the storage device itself, referencing data in a centralized, updated database, or through independent empirical observations during common usage. For example, the storage manager 280 can learn of the storage capacity of the hard disk drive 141 and the solid-state drive 142 by querying such drives or, more specifically, the control circuitry present within such drives. Conversely, the storage manager 280 can learn of the performance of the hard disk drive 141 and the solid-state drive 142 by, for example, consulting an updated database, such as one available on the network 90, which can be accessed through the general network connection 171. In one embodiment, such an accessible database could comprise, for a large number of different drives, a myriad of performance information, such as the speed with which particular drives read or write small or large amounts of data, and whether such data is contiguous or randomly distributed.

With the capability and performance information, the storage manager 280 can determine how to best divide the available storage media into parts. As indicated, as one example, the storage manager 280 can determine to divide the storage media into parts according to the physical drive structure within which such media is provided. Thus, as an example, the storage manager 280 can delineate all of the storage media of the hard disk drive 141 as a storage media part 310 and can, likewise, delineate all of the storage media of the solid-state drive 142 as a storage media part 335.

In another embodiment, however, differences in manufacturing, design, or implementation can result in specific portions or aspects of a single storage device having differing capabilities and performance characteristics from other portions or aspects of the same storage device. For example, as shown in the system 300 of FIG. 3, the magnetic-based storage device 341, such as a common hard disk drive, can comprise multiple platters 371, 372, 373, 374 and 375. However, the performance characteristics of any given platter may not be homogenous across all of the platters. For example, due to manufacturing differences, platter 371 may be measurably faster at reading and writing large blocks of sequential data than any of the other platters 372, 373, 374 and 375. In such a case, the storage manager 280 can define a storage media part 315 such that the defined storage media part exclusively encompasses the platter 371 without including the other platters 372, 373, 374 and 375 from the hard disk drive 341. Although not shown in FIG. 3 to maintain readability, a storage media part can consist entirely of only a portion of a platter or other physical structure within a storage device. Thus, as an example, the storage manager 280 could define one storage media part to encompass one portion of the platter 371 and another storage media part to encompass another portion of the same platter 371. Such a division of the platter can be especially useful in rotational storage devices, where the speed with which data is read and written can increase at the outer portions of the rotational medium, such as the platter 371, as opposed to the inner portions of the same medium.

Empirical evidence may also indicate, for example, that the transition between storage media, such as between platters 373 and 374 may occur very quickly, such that information written across, or read across, those two platters is delivered or accessed more efficiently than other information storage on the hard disk drive 341. In such a case, the storage manger 280 need not be confined to defining storage media parts in accordance with physical boundaries, such as the boundary of a physical storage device, such as the hard disk drive 141, or even the physical boundary of an individual storage medium, such as the platter 371. Instead, as illustrated in the system 300, in one embodiment, the storage manager 280 can define a storage media part 325 that can comprise a portion of one platter, or other physical medium, such as the platter 373 in the current example, and a portion of another platter, or other physical medium, such as the platter 374 in the current example.

In one embodiment, after establishing and delineating some storage media parts in accordance with unique capability or performance, such as the storage media parts 315 and 325, the storage manager 280 can divide the remaining storage media of a storage device, such as the hard disk drive 341, into one or more storage media parts that may not necessarily possess unique capability or performance. Thus, as shown in FIG. 3, the storage manager 280 can define and delineate storage media parts 320 and 330 to encompass those portions of the platters 372, 373, 374 and 375 that were not already included in a previously defined storage media part.

If appropriate, a similar division of solid-state based storage devices, such as the solid-state based storage device 342, can also be performed. Although solid-state based storage devices may comprise different physical reasons for which particular segments, groupings, collections, or other assortments of the underlying media may perform differently or comprise different capabilities, the storage manager 280 can, in one embodiment, apply the same division of a drive into storage media parts to solid-state based storage devices as it does to magnetic-based storage devices. Thus, as shown in FIG. 3, by way of example only, the storage manager 280 can divide the storage media of solid-state drive 342 into storage media parts 340 and 345, with the storage media part 340 comprising chipset 391, while the storage media part 345 comprises the remaining chipsets 392, 393 and 394. Such a division can, as described above, be based on differences in capability or performance of the chipset 391 as compared to the chipsets 392, 393 and 394. Such differences can arise from manufacturing deviations, or they can be explicitly designed, such as, for example, if the solid-state drive 342 was designed to comprise a small amount of high-speed storage capacity for optimization purposes. For example, the chipset 391 could comprise SLC memory, which, as will be known by those skilled in the art, can have greater performance than MLC memory, while the chipsets 392, 393 and 394 may comprise MLC memory.

Although not specifically illustrated in FIG. 3, the storage manager 280 can also define a storage media part that extends, not only across multiple physical storage media, such as platters or chipsets, but also across devices. Thus, for example, if another magnetic-based storage device was added to the non-removable, non-volatile storage media connected to the computing device 100, the storage manager 280 could expand the storage media part 310 to comprise not only the device 141, but the new device as well. Such an extension could amalgamate the storage capacity of the two devices, or it could establish the two devices in a redundant manner or other configuration.

Figure 4:
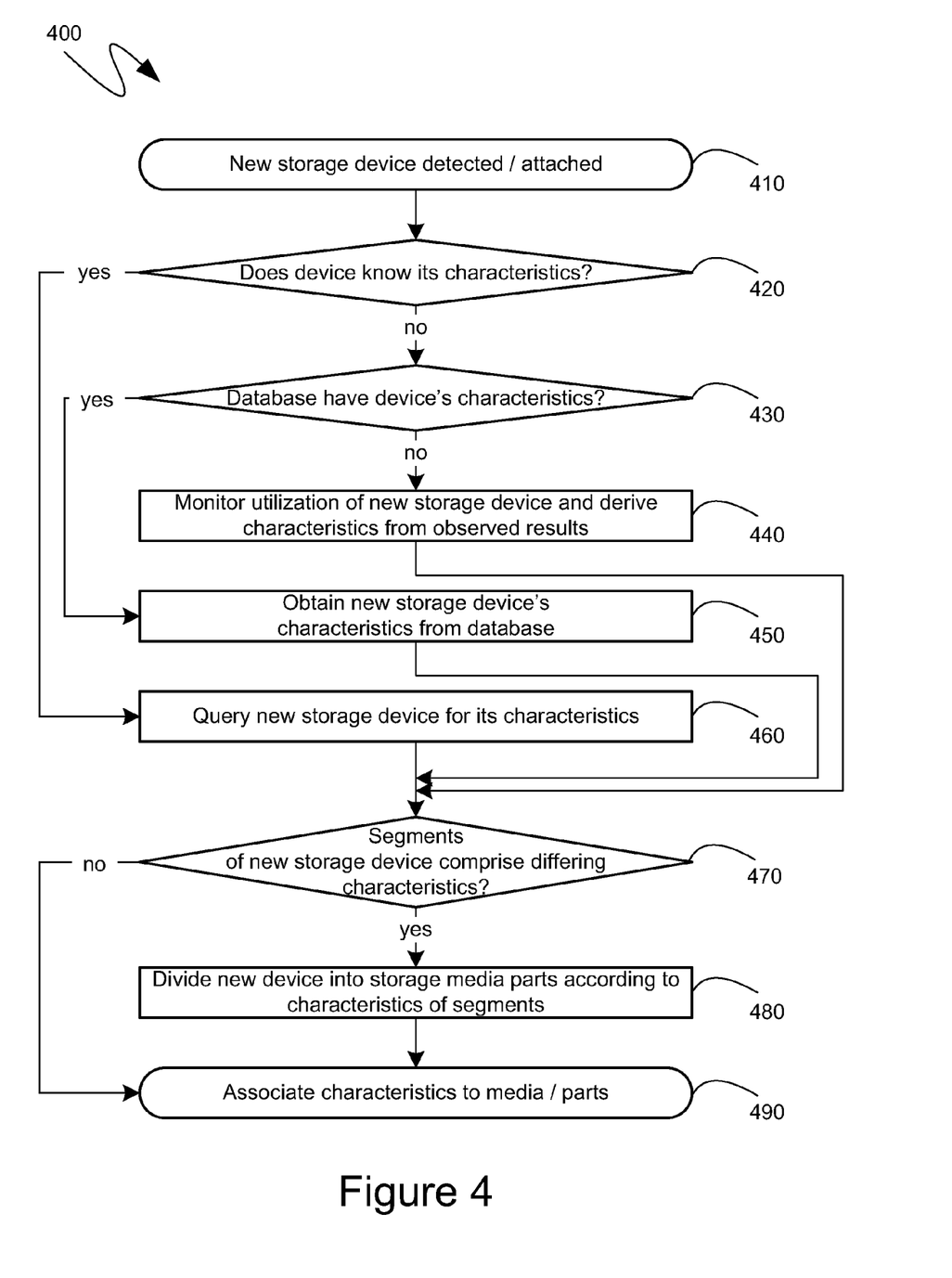
FIG. 4 is a flow diagram of an exemplary initiation of a new storage device.

The process by which storage media can be divided into storage media parts is further described with reference to the flow diagram 400 of FIG. 4. Turning to FIG. 4, as can be seen, initially, at step 410 of the flow diagram 400, a new storage device can be communicationally coupled to the computing device 100, or, alternatively, the storage manager 280 can become aware of a new storage device, including storage devices that may have been previously utilized by the computing device 100. Subsequently, at step 420, the storage manager 280 can determine if the new storage device comprises information regarding its characteristics, such as its capabilities or performance. If the new storage device does comprise such information, such as, for example, in its firmware or other portion of the storage device control circuitry 260 of such a storage device, then processing can proceed to step 460, and the storage manager 280 can query the new device for its characteristics, including capabilities and performance characteristics.

If, on the other hand, the storage manager 280 determines, at step 420, that the new storage device is not aware of its characteristics, the storage manager can proceed, at step 430, to check a database to determine if the device's characteristics are contained therein. If, at step 430, the storage manager 280 determines that it can obtain the storage device's characteristics from a database, then processing can proceed to step 450, wherein the storage manager can obtain the new storage device's characteristics, including capabilities and performance information, from the database.

If, at step 430, the storage manager 280 determines that the device's characteristics are not available from a database, or other like source, the storage manager 280 can, at step 440, proceed to empirically determine the device's characteristics, such as by monitoring utilization of the new storage device by other processes executing on the computing device 100. Such monitoring can proceed either until the storage manager 280 comprises sufficient information from which to derive empirically determined characteristics of the new storage device, or such monitoring can proceed indefinitely, with new information being utilized to update and adjust the previously empirically determined characteristics.

Once the storage manager 280 has obtained or determined the characteristics of the new storage device, such as via one of the steps 440, 450, or 460, processing can proceed to the evaluation steps 470 and 480. At step 470, the storage manager can determine whether to divide the new storage device into segments or parts. As indicated previously, such a determination can be based, at least in part, on whether particular portions of the storage media of the new storage device exhibit characteristics that differ in some material manner, from the characteristics of other portions of the storage media of the new storage device. Additionally, the determination, at step 470, can also be based on the existence of other storage devices, such as devices previously communicationally coupled to the computing device 100, which may share some of the characteristics of the new storage device and, as such, be candidates for a storage medium part that extends across the new storage device and the prior storage devices.

If, at step 470, the storage manager 280 determines that no differing segments exist within the new storage device and that the new storage device does not need to be divided into storage media parts that either include portions of the new storage device, or that combine the new storage device with other storage devices, processing can proceed to step 490. However, if, at step 470, the storage manager 280 determines that differing segments exist within the new storage device, or that some or all of the new storage device should be included in a previously defined storage media part, the storage manager 280 can, at step 480, divide the new storage device into storage media parts as appropriate. As indicated previously, such a division can be based on the determined or obtained characteristics of the storage media of the new storage device.

Subsequently, relevant processing can end at step 490 with the storage manager assigning the determined or obtained characteristics, such as capability or performance characteristics, to the media of the new storage device or to any parts established or utilized at step 480.

Once the media of the new storage device has been assigned a particular set of characteristics, the storage manager 280 can proceed to utilize the metadata described above to perform media optimization and select an optimal storage media part, from among the storage media parts available, on which to store the data associated with the metadata. Turning to the flow diagram 500 of FIG. 5, such media optimization is illustrated in greater detail. As can be seen from the flow diagram 500, initially, at step 510, data to be stored on one or more of the storage devices 149 communicationally coupled to the computing device 100 can be received along with associated metadata. In another embodiment, step 510 can comprise the receipt of only metadata that can be received about data that may already be stored on the storage media 270 of the one or more storage devices 149. In either embodiment, processing can proceed with step 520 wherein the storage manager 280 can select one or more of the storage media or storage media parts, delineated previously, on which to store the received data, or to which to move data that may already be stored elsewhere on the storage media 270 of the one or more storage devices 149.

Figure 5:
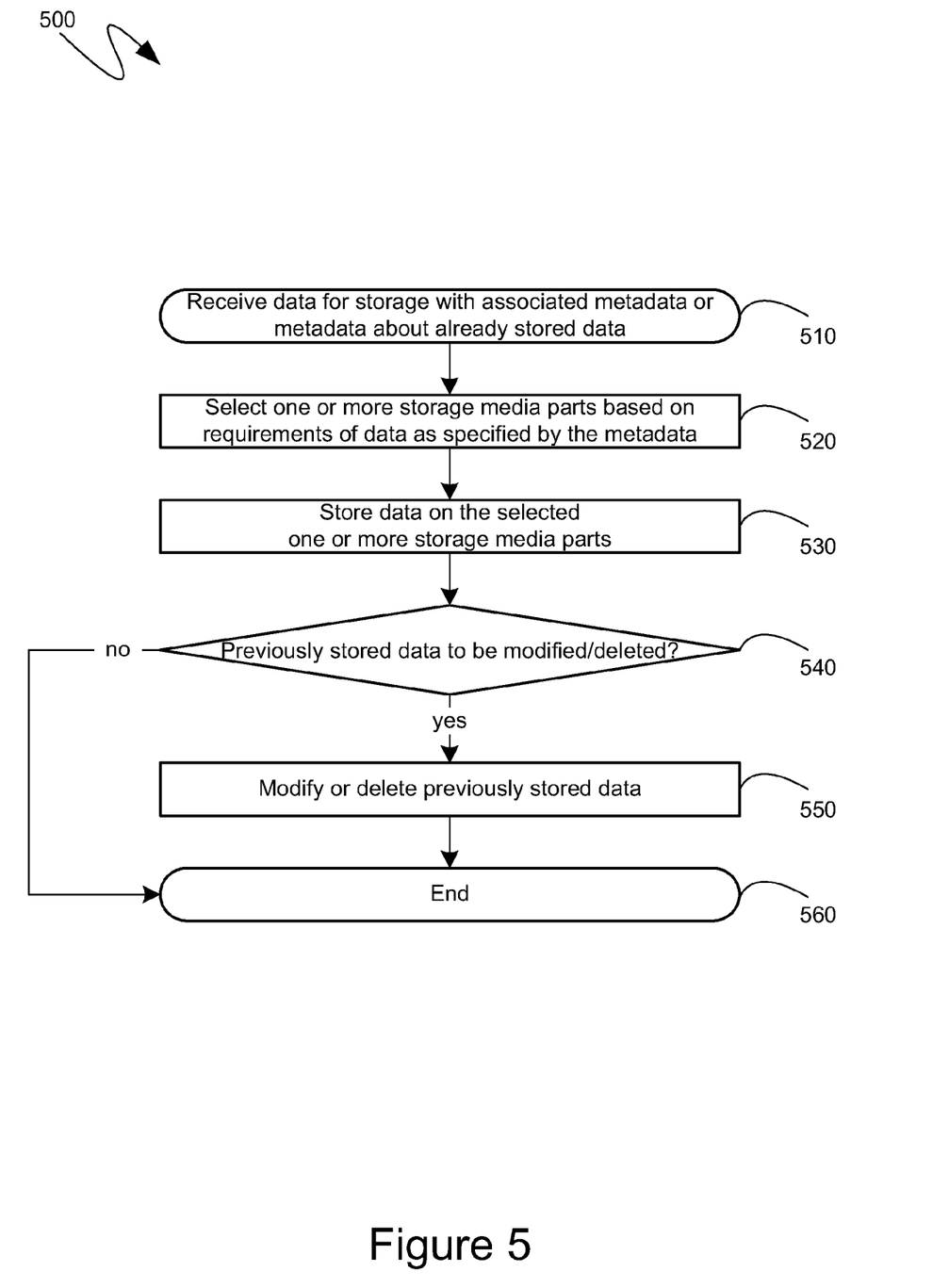
FIG. 5 is a flow diagram of an exemplary optimization of data storage on available storage media according to metadata associated with the data.

The decision, at step 520, of which one or more storage media parts to select on which to store or move the data can be based on the metadata associated with the data. More specifically, information in the metadata regarding the size of the data, its importance, expected access patterns, required read or write speeds, and other like information can be utilized to select one or more storage media parts on which to store or move the data. For example, if the metadata received at step 510 indicates that the data needs to be accessed quickly, such as, for example, if the data is part of a virtual memory cache or other cache, then the storage manager 280 can, at step 520, select one or more storage media parts that have fast data reading and writing abilities for small amounts of randomly scattered data, such as storage media parts associated with solid-state based storage media devices. Conversely, if the metadata received at step 510 indicates that the data comprises a large volume of information, such as, for example, a video file, or an archive file, the storage manager 280 can, at step 520, select one or more storage media parts that can have fast data writing capabilities for a large amount of contiguous data, such as, for example, storage media parts associated with large volume magnetic-based storage devices.

As another example, if the metadata received at step 510 indicated that the data is important, such that no data loss is acceptable, then, at step 520, the storage manager 520 can store the data in a redundant manner across multiple storage media parts to minimize the chances of data loss. The storage of redundant data across multiple storage media parts can also be utilized by the storage manager 280 to, for example, store the same data on both a storage media part associated with a solid-state based storage device and a storage media part associated with a magnetic-based storage device, to provide advantageous benefits of both storage technologies. Alternatively, the storage of redundant data across multiple storage media parts can be utilized by the storage manager 280 to maximize the speed with which data is written and read, since such storage can enable multiple storage devices to operate independently on portions of the data in parallel, thereby increasing throughput.

Once the storage manager 280 has selected, at step 520, the one or more storage media parts on which to store the data, the storage manager can, at step 530, store the data on the selected storage media parts. Subsequently, at step 540, the storage manager 280 can determine if any previously stored data needs to be modified or deleted. For example, in one embodiment, at step 510 the storage manager 280 can receive metadata about data that is already stored on the storage media 270 of the one or more storage devices 149. In such a case, the storage manager 280 may determine, at step 520, that the storage media parts on which it would be optimal to store the already-stored data, based on the information contained in the metadata received at step 510, may be different than the current storage locations of such data. In such a case, the data can be copied to the optimal storage locations at step 530. Subsequently, however, at step 540, the storage manager 280 can determine that that data no longer needs to be stored in its former locations.

If, at step 540, the storage manager 280 determines that there is data, such as data that was moved to optimal storage locations but is still also stored in its former locations, that should be modified or deleted, the storage manager can, at step 550, modify or delete the data. The relevant processing can then end at step 560. Alternatively, if at step 540, the storage manager 280 determines that there is no data that should be modified or deleted, the relevant processing can simply conclude at step 560.

As can be seen from the above descriptions, mechanisms for optimally storing data on one or more storage media or storage media parts, based on metadata associated with the data, have been provided. In view of the many possible variations of the subject matter described herein, we claim as our invention all such embodiments as may come within the scope of the following claims and equivalents thereto.

We claim:

1. One or more computer-readable media comprising computer-executable instructions for optimizing the storage of computer-readable data on computer-readable storage media that are part of one or more storage devices, the computer-executable instructions directed to steps comprising:
    obtaining characteristics of the computer-readable storage media;
    dividing the computer-readable storage media into one or more storage media parts, the one or more storage media parts being delineated based on variances in the characteristics of the computer-readable storage media and such that at least one storage media part comprises computer-readable storage media from at least two different storage devices;
    receiving metadata about the computer-readable data;
    selecting one or more of the one or more storage media parts based on a complementary match between characteristics of the selected one or more storage media parts and at least one aspect of the received metadata; and
    storing the computer-readable data on the selected one or more storage media parts.

2. The computer-readable media of claim 1, wherein the computer-executable instructions directed to obtaining the characteristics of the computer-readable storage media comprise computer-executable instructions directed to querying the one or more storage devices for the characteristics of the computer-readable storage media associated with the one or more storage devices.

3. The computer-readable media of claim 1, wherein the computer-executable instructions directed to obtaining the characteristics of the computer-readable storage media comprise computer-executable instructions directed to querying a database comprising identifications of storage devices and characteristics of computer-readable storage media associated therewith.

4. The computer-readable media of claim 1, wherein the computer-executable instructions directed to obtaining the characteristics of the computer-readable storage media comprise computer-executable instructions directed to monitoring the one or more storage devices to collect empirical data while they are being used and deriving the characteristics of the computer-readable storage media associated with the one or more storage devices from the empirical data.

5. The computer-readable media of claim 1, wherein the computer-executable instructions directed to dividing the computer-readable storage media into the one or more storage media parts comprise computer-executable instructions directed to dividing the computer-readable storage media into the one or more storage media parts such that at least one storage media part comprises a subset of computer-readable storage media of a single storage device.

6. The computer-readable media of claim 1, wherein the computer-executable instructions directed to the receiving of the metadata comprise computer-executable instructions directed to receiving the metadata independently of the computer-readable data.

7. The computer-readable media of claim 1, wherein the computer-executable instructions directed to the storing of the computer-readable data comprise computer-executable instructions directed to copying the computer-readable data to the selected one or more storage media parts from other locations on the computer-readable storage media, the computer-readable media comprising further computer-executable instructions directed to deleting a copy of the computer-readable data from the other locations on the computer-readable storage media.

8. A method of optimizing the storage of computer-readable data on computer-readable storage media that are part of one or more storage devices, the method comprising the steps of:
    obtaining characteristics of the computer-readable storage media;
    dividing the computer-readable storage media into one or more storage media parts, the one or more storage media parts being delineated based on variances in the characteristics of the computer-readable storage media and such that at least one storage media part comprises computer-readable storage media from at least two different storage devices;
    receiving metadata about the computer-readable data;
    selecting one or more of the one or more storage media parts based on a complementary match between characteristics of the selected one or more storage media parts and at least one aspect of the received metadata; and
    storing the computer-readable data on the selected one or more storage media parts.

9. The method of claim 8, wherein the obtaining the characteristics of the computer-readable storage media comprises querying the one or more storage devices for the characteristics of the computer-readable storage media associated with the one or more storage devices.

10. The method of claim 8, wherein the obtaining the characteristics of the computer-readable storage media comprises querying a database comprising identifications of storage devices and characteristics of computer-readable storage media associated therewith.

11. The method of claim 8, wherein the obtaining the characteristics of the computer-readable storage media comprises monitoring the one or more storage devices to collect empirical data while they are being used and deriving the characteristics of the computer-readable storage media associated with the one or more storage devices from the empirical data.

12. The method of claim 8, wherein the dividing the computer-readable storage media into the one or more storage media parts comprises dividing the computer-readable storage media into the one or more storage media parts such that at least one storage media part comprises a subset of computer-readable storage media of a single storage device.

13. The method of claim 8, wherein the receiving of the metadata comprises receiving the metadata independently of the computer-readable data.

14. The method of claim 8, wherein the storing the computer-readable data comprises copying the computer-readable data to the selected one or more storage media parts from other locations on the computer-readable storage media, the method further comprising the step of deleting a copy of the computer-readable data from the other locations on the computer-readable storage media.

15. A system that optimizes the storage of computer-readable data on computer-readable storage media, the system comprising:
    a computing device executing computer-executable instructions that generate the computer-readable data and associated metadata;
    at least one storage device, comprising the computer-readable storage media, communicationally coupled to the computing device; and
    a storage manager that obtains characteristics of the computer-readable storage media, divides the computer-readable storage media into one or more storage media parts delineated based on variances in the characteristics of the computer-readable storage media, receives the associated metadata, selects one or more of the one or more storage media parts based on a complementary match between characteristics of the selected one or more storage media parts and at least one aspect of the received metadata, and causes the storing of the computer-readable data on the selected one or more storage media parts;
    wherein the storage manager comprises computer-executable instructions executed by the computing device.

16. The system of claim 15, wherein the storage manager obtains the characteristics of the computer-readable storage media by deriving the characteristics based on empirical data collected by monitoring usage of the at least one storage device by the computing device.

17. The system of claim 15, wherein the storage manager divides the computer-readable storage media into the one or more storage media parts such that at least one storage media part comprises a subset of computer-readable storage media of a single storage device.

* * * * *